United States Patent [19]
Murakami et al.

[11] Patent Number: 4,466,793
[45] Date of Patent: Aug. 21, 1984

[54] HEAT TREATMENT JIG FOR USE IN THE MANUFACTURE OF CATHODE-RAY TUBES

[75] Inventors: Yoshihiro Murakami, Kobe; Toyoshi Takeuchi, Ōtsu; Isao Ishii, Amagasaki; Tadaki Murakami, Minoo; Hiroshi Takayanagi, Sanda, all of Japan

[73] Assignee: Mitsubishi Denki Kaisha, Tokyo, Japan

[21] Appl. No.: 482,046

[22] Filed: Apr. 4, 1983

[51] Int. Cl.$^3$ .............................................. F27D 5/00
[52] U.S. Cl. .................................... 432/253; 452/258
[58] Field of Search ..................... 432/253, 254.2, 258, 432/259

[56] References Cited

U.S. PATENT DOCUMENTS 1,186,491  6/1916  Moorcroft ........................... 432/259
2,656,170 10/1953  Mann .................................. 432/253
3,958,924  5/1976  Egenolf et al. ..................... 432/258

OTHER PUBLICATIONS

"Bulletin of the Chemical Society of Japan", (Weathering of H$_3$BO$_3$–ZnO Bond for Forming Glass Fiber Reinforced Composite), vol. 55, No. 4, Apr. 1982, pp. 1333–1334.

"Reaction Mechanism of H$_3$BO$_3$–ZnO Bonding Material Under Hot–Pressing and Heat Treatment", (The Journal of the American Ceramic Society), vol. 64, No. 11, Nov. 1981, pp. C164–C165.

Primary Examiner—Henry C. Yuen
Attorney, Agent, or Firm—Wenderoth, Lind & Ponack

[57] ABSTRACT

The present invention is a heat treatment jig for use in the baking process, the frit seal process, and the evacuation process during the manufacture of cathode-ray tubes. It comprises a base and one or more support members formed from a novel material comprising mica, talc, orthoboric acid, boric acid anhydride, and zinc oxide molded under heat and pressure. This novel molded material is superior in its mechanical properties to the substances (asbestos tape, asbestos cement, or boron nitride) used for the support members of conventional heat treatment jigs. In addition, it does not pose a danger to health like asbestos products and it is far lower in cost than boron nitride.

1 Claim, 6 Drawing Figures

HEAT TREATMENT JIG FOR USE IN THE MANUFACTURE OF CATHODE-RAY TUBES

BACKGROUND OF THE INVENTION

The present invention relates to heat treatment jigs for use in the manufacture of cathode-ray tubes, and in particular to a heat treatment jig for use in the baking process, the frit seal process, and the evacuation process, the jig employing a novel material for the support portion which supports the item to be heat treated.

During the production of a cathode-ray tube (hereinafter referred to as a CRT) various components require heat treatment, both before and after being assembled with other components. For example, a panel glass assembly such as the one shown in FIG. 1 will undergo heat treatment two times before being assembled with the envelope of the CRT. The panel glass assembly of FIG. 1 comprises a panel glass 1 having a seal 1a, and an inner surface 1b, the latter of which is coated with a fluorescent surface 2. Inside the panel glass 1 is housed a shadow mask 3, which is attached to the panel glass 1 with panel pins 4. Prior to and subsequent to the formation of the fluorescent surface 2 on the inner surface 1b, the panel glass assembly undergoes heat treatment at 400°–500° C. in a continuous kiln. This heat treatment of the panel glass assembly is referred to as the baking process.

FIG. 2 shows a panel glass assembly mounted on a heat treatment jig (in this case, a "baking jig") as it would appear during the baking process. The baking jig 5 comprises a base 6 and heat resistant, electrically insulating support members 7, atop which sits the panel glass assembly.

The success of the baking process and the quality of the completed CRT are greatly dependent upon the physical properties of the material used for the support members 7. If the support members 7 are made of an extremely hard material, they produce scratches, cracks, and other mars in the seal 1a which can result in breakage of the panel glass 1.

On the other hand, if the support members 7 are made of an excessively soft material, different but equally serious problems may occur. For example, if the support members 7 are too soft, they will wear down rapidly and require frequent replacement. More importantly, the dust produced by such wearing down may ruin the panel glass assembly if it enters inside the seal 1a. That is, such dust mars the insulating properties of the CRT, and if dust adheres to some location on the seal 1a, the high voltage existing during operation of the CRT may produce a breakdown in insulation at that location, making the CRT unusable.

At present, the most widely used materials for the support members 7 of baking jigs are asbestos tape, asbestos cement, and boron nitride, all of which have drawbacks. Asbestos tape does not produce scratches or cracks, but it easily produces dust. Asbestos cement, being harder than asbestos tape, does not produce dust, but it tends to scratch the seal 1a of the glass panel 1. Further, both asbestos tape and asbestos cement pose health hazards. Boron nitride does not mar the seal 1a, but it adheres to the seal 1a. After the baking process, the panel glass assembly is connected to the funnel of the CRT envelope using solder glass in the so-called frit seal process. However, at those locations on the seal 1a that boron nitride adheres to, solder glass will not adhere, resulting in a mechanically and eletrically weak seal between the panel glass assembly and the funnel, which may result in serious functional problems. Moreover, boron nitride is not only extremely expensive, it also wears down quite rapidly.

Asbestos tape, asbestos cement, and boron nitride are also used for the support members of heat treatment jigs used in the frit seal process and the evacuation process during the manufacture of CRT's. Here, these materials pose much the same problems as they do when used in baking jigs. Because of their use of these three materials, conventional heat treatment jigs are far from satisfactory.

SUMMARY OF THE INVENTION

It is the object of the present invention to provide a heat treatment jig for use in the heat treatment of CRT's, the jig employing support members which do not scratch the surface of the item which they support nor produce dust during use nor adhere to the surface of the item.

The heat treatment jig according to the present invention comprises a conventional base and one or more heat resistant, electrically insulating support members formed from a novel molded material comprising mica, talc, orthoboric acid, boric acid anhydride, and zinc oxide molded under heat and pressure. This novel molded material does not produce scratches or other mars in glass, it does not produce dust, it does not appreciably adhere to glass, it poses no health hazard, and it is extremely low in cost.

DESCRIPTION OF THE PREFERRED EMBODIMENTS

Below will be described 3 embodiments of a heat treatment jig for use in the manufacture of cathode ray tubes. The first is a so-called baking jig. The second is a frit seal jig for use in the frit seal process, and the third embodiment is a jig for use in the evacuation process.

Figure 1:
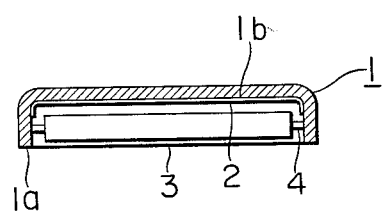
FIG. 1 is a cross-sectional view of the panel glass assembly of a CRT.
Figure 2:
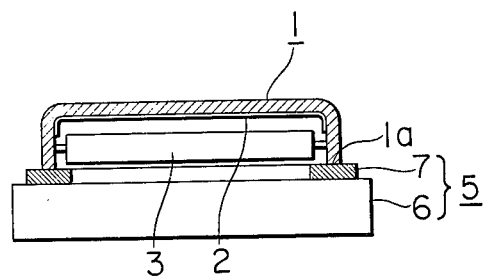
FIG. 2 shows a cross-sectional view of a conventional baking jig supporting the panel glass assembly of FIG. 1 as it would appear during the baking process.
Figure 3:
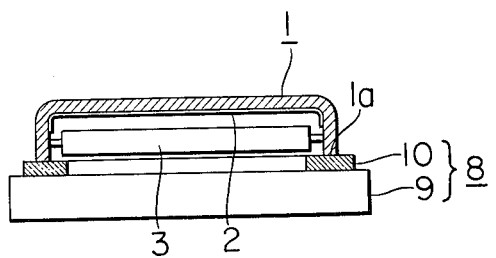
FIG. 3 shows a first embodiment of a heat treatment jig according to the present invention as it would appear during the baking process while supporting the panel glass assembly of FIG. 1.

The first embodiment of a heat treatment jig according to the present invention is shown in FIG. 3, in which reference numbers identical to those used in FIGS. 1 and 2 refer to identical parts. In the Figure, 8 is a heat treatment jig (in this case, a baking jig) comprising a conventional base 9 and one or more support members 10 rigidly secured to the base 9. The support members 10 are formed from a heat resistant, electrically insulating material comprising 20% by weight of mica, 45% by weight of talc, 16.3% by weight of orthoboric acid, 3.7% by weight of boric acid anhydride, and 15% by weight of zinc oxide, molded under heat and pressure into an appropriate shape.

The manufacture of the material used for the support members 10 is as follows. Mica powder, talc powder, orthoboric acid, boric acid anhydride, and zinc oxide in the above weight percentages are mixed for 10 minutes, packed in a mold, and then molded at 170°–180° C. under a pressure of 150 kg/cm². While still in the mold, the material is maintained at 160° C. for 5 minutes. After cooling to 150° C., it is released from the mold and machined. Table 1 shows some of the physical properties of the molded substance so formed. For the sake of comparison, the corresponding properties of boron nitride are also shown.

TABLE 1

|  | Novel Molded Material | Boron Nitride |
|---|---|---|
| Volume resistivity ($\Omega \cdot cm$) | $1.0 \times 10^{14} \, \Omega \cdot cm$ | $1.0 \times 10^{14} \, \Omega \cdot cm$ |
| Bending strength (kg/cm²) | 400–600 kg/cm² | 500 kg/cm² |
| Heat distortion temperature (°C.) | 900° C. | 1500° C. |
| Hardness (Mohs) | 2 | 2 |
| Machinability | Excellent | Excellent |
| Cost | Inexpensive: same as asbestos cement/ $\frac{1}{4}$–1/5 price of boron nitride | Expensive |
| Adhesion to glass | Almost none | Considerable |
| Wear | Small ($\frac{1}{4}$ that of boron nitride) | Considerable |

As can be seen from the table, the molded material used in the present invention has nearly the same volume resistivity, bending strength, hardness, and machinability as does boron nitride. The heat distortion temperature of this novel molded material, while lower than that of boron nitride, is fully adequate for use in the baking process, which is carried out at 400°–500° C. It also has excellent electrical insulating properties.

This molded material is superior to boron nitride in that it does not appreciably adhere to glass, it wears much less (requiring less frequent replacement), and it is far lower in price. In addition, unlike asbestos cement or asbestos tape it produces neither scratches nor dust, and it poses no hazard to health. It is thus extremely appropriate for use in the support members of a baking jig.

Figure 4:
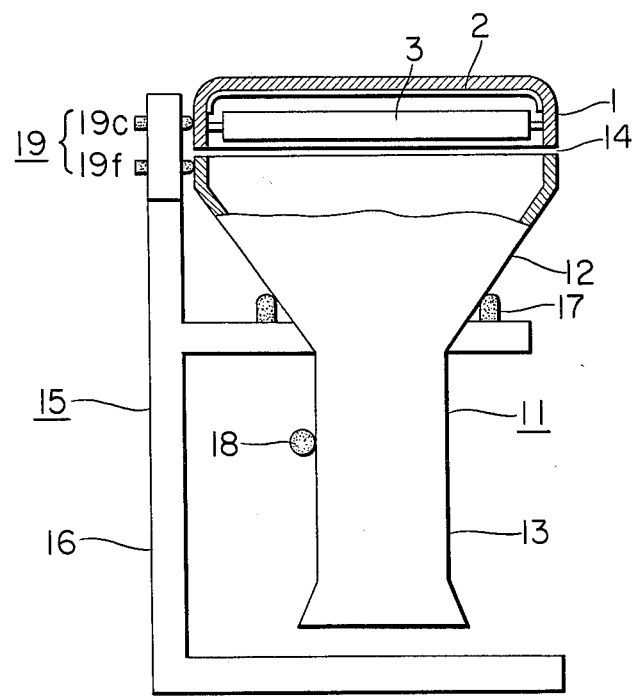
FIG. 4 shows a vertical cross-section of a second embodiment of a heat treatment jig according to the present invention as it would appear during the frit seal process while supporting the envelope of a CRT.
Figure 5:
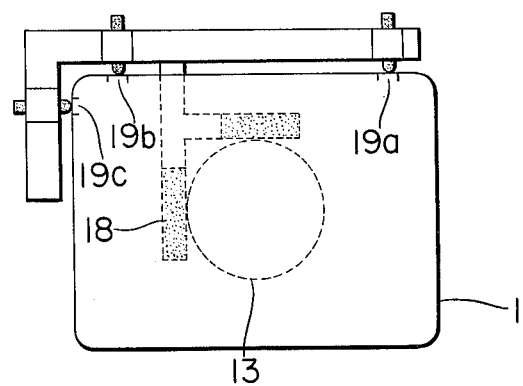
FIG. 5 is a cross-sectional plan view of the embodiment of FIG. 4.

FIGS. 4 and 5 show a second embodiment of a heat treatment jig according to the present invention. This second embodiment is a so-called seal jig for use in the frit seal process, which takes place subsequent to the baking process. In the frit seal process, the panel glass 1 is connected to the funnel 12 of the envelope of a CRT by means of solder glass 14. The seal jig 15 bearing the CRT envelope 11 and the panel glass 1 is passed through a continuous kiln at 400°–460° C., at which temperature the solder glass 14 between the panel glass 1 and the funnel 12 melts. The seal jig 15 of FIGS. 4 and 5 comprises a conventional base 16, one or more funnel support members 17 secured to the base 16 which carry the weight of the envelope 11 and contact the funnel 12, one or more neck support members 18 secured to the base 16 which restrict the horizontal movement of the neck 13 of the envelope 11, and six horizontal support members 19a–f secured to the base 16. The horizontal support members 19a–f comprise three upper members 19a–c which contact the panel glass 1, and three lower members 19a–f which contact the funnel 12 of the envelope 11 and maintain the horizontal alignment between the panel glass 1 and the funnel 12. All of the support members 17, 18, and 19a–f are formed from the same novel molded material used for the support members 10 of the first embodiment according to the present invention, described earlier. Because it neither mars the glass which it contacts nor produces dust, the novel molded material used in the present invention is particularly suitable for the various support members 17, 18, 19a–f. These two factors make it superior to asbestos tape and asbestos cement, and its low price and greater resistance to wear make it superior to boron nitride for use in a seal jig.

Subsequent to the frit seal process, an electron gun is installed in the neck 13 of the CRT envelope 11, the neck 13 is sealed, and then substantially all air is removed from the inside of the CRT envelope in the so-called evacuation process, which takes place in a continuous kiln at 200°–450° C.

Figure 6:
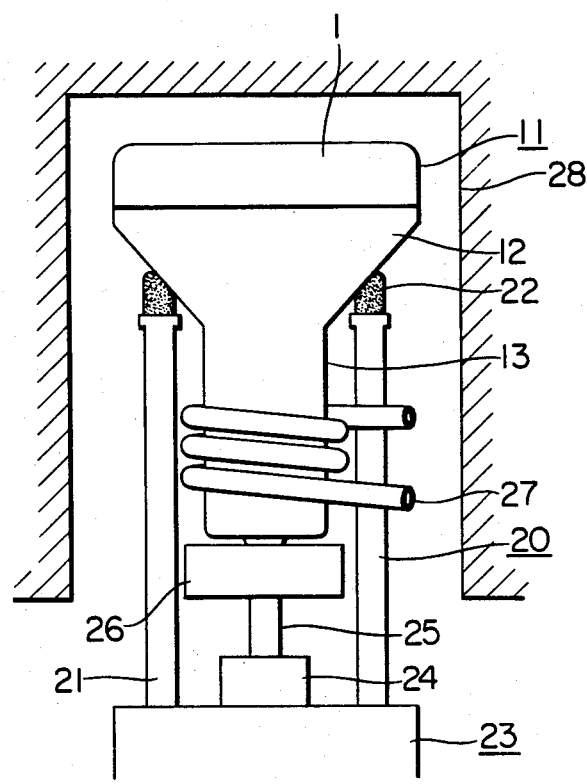
FIG. 6 is a vertical cross-section of a third embodiment of a heat treatment jig according to the present invention as it would appear during the evacuation process.

FIG. 6 is a third embodiment of a heat treatment jig according to the present invention for use in the evacuation process. This heat treatment jig 20 comprises a conventional base 21 having a number of legs with a support member 22 affixed to the top of each leg of the base 21. The support members 22 are formed from the same novel molded material used for the support members 10 and the support members 17, 18, and 19a–f in the first and second embodiments, respectively, of a heat treatment jig according to the present invention. The base 21 is mounted atop an evacuation cart 23 (not part of the jig 20) having an evacuation opening 24, an evacuation tube 25 which connects to the inside of the CRT envelope 11, and an electric socket 26 which connects to the electron gun (not shown) housed in the neck 13 of the envelope 11. Around the neck 13 is wrapped a high frequency coil 27 which is used to heat the neck 13 while the envelope 11 is passing through a continuous kiln 28. Because the support members 22 directly contact with the funnel 12, the novel molded material described earlier comprising mica, talc, orthoboric acid, boric acid anhydride, and zinc oxide is particularly appropriate for use in these members, since this material will not mar the surface of the funnel 12 nor produce dust, making it superior to asbestos tape and asbestos cement. Further, its low cost and resistance to wear make it much more suitable than boron nitride for use in this type of jig, just as in the baking jig and seal jig described earlier.

What is claimed is:

1. A heat treatment jig for use in the heat treatment of cathode-ray tubes, comprising:
  a base; and
  one or more heat resistant, electrically insulating support members rigidly secured to said base, said support members comprising mica, talc, orthoboric acid, boric acid anhydride, and zinc oxide molded under heat and pressure.

* * * * *